Patented Sept. 10, 1946

2,407,396

UNITED STATES PATENT OFFICE 2,407,396

STABILIZATION OF TETRAFLUORO-
ETHYLENE

Merlin Martin Brubaker, Boothwyn, Pa., assignor to E. I. du Pont de Nemours & Company, Wilmington, Del., a corporation of Delaware No Drawing. Application February 15, 1943,
Serial No. 476,027

10 Claims. (Cl. 260—652.5)

This invention relates to new compositions of matter and more particularly to compositions comprising fluoroethylenes which are stabilized against spontaneous polymerization.

Tetrafluoroethylene polymerizes after standing a few days at room temperature under superatmospheric pressure in accordance with the teaching of U. S. Patent 2,230,654. This spontaneous polymerization of tetrafluoroethylene is acutely undesirable since it necessitates costly and time-consuming precautions for the safe storing of tetrafluoroethylene. Thus prior to the present invention it has been an accepted practice to store tetrafluoroethylene at the temperature of solid carbon dioxide since only in this way could polymerization be prevented and tetrafluoroethylene stored in an appreciable quantity over a period of time.

This invention has as an object the production of stabilized fluoroethylenes which can be stored at normal temperature and superatmospheric pressure for an indefinite period of time without undergoing spontaneous polymerization. Other objects will appear hereinafter.

I have discovered that this polymerization of fluoroethylene compounds can be prevented by incorporating therewith a small proportion of a compound containing thiol sulfur and that the stabilized product thus obtained can be stored at normal temperature and superatmospheric pressure for an indefinite period of time without undergoing polymerization. For example, tetrafluoroethylene to which is added about 0.1% to 1% by weight of n-butyl mercaptan undergoes no spontaneous polymerization whatever on storage under its own vapor pressure at 25° C., whereas unstabilized tetrafluoroethylene undergoes appreciable polymerization in a few days under such conditions.

The invention is further illustrated by the following examples:

Example I

A thick walled glass tube is filled half full of liquid tetrafluoroethylene by condensation with the tube cooled in liquid ethylene. The free space above the liquid is then displaced with hydrogen sulfide, the tube is frozen in a bath of liquid nitrogen and then sealed. It is allowed to stand at room temperature, under which conditions the liquid tetrafluoroethylene is under its own vapor pressure. After one week there is formed a very small quantity (less than 1% based on the tetrafluoroethylene present) of a greasy material bearing little resemblance to polytetrafluoroethylene. Under similar conditions, unstabilized tetrafluoroethylene polymerizes completely in this length of time.

Example II

To a glass tube similar to that employed in Example I is added about 0.5 part of butyl mercaptan and the tube is then immersed in liquid ethylene and filled about half full of liquid tetrafluoroethylene (about 25 parts). The tube is then placed in liquid nitrogen, frozen, and sealed. After standing at room temperature under its own vapor pressure for 6.25 months, there is formed only the smallest unweighable trace of polymer. Under similar conditions unstabilized tetrafluoroethylene polymerizes completely in about one week.

Example III

Example II is repeated using ethanedithiol in place of butyl mercaptan as stabilizer. After 6.25 months a very small amount (considerably less than 1% by weight of the tetrafluoroethylene) of a white greasy material is formed.

Example IV

Example II is repeated using octyl mercaptan in place of butyl mercaptan as stabilizer. No polymerization takes place in 1.5 months under these conditions.

Example V

Tetrafluoroethylene stored in the absence of its liquid phase under 200 lbs./sq. in. pressure at room temperature in a steel container undergoes considerable spontaneous polymerization after standing for about a month. To the storage container in which the tetrafluoroethylene is stored under the mentioned conditions is added 0.5% by weight of n-butyl mercaptan which effectively prevents appreciable polymerization over a period of several months.

The fluoroethylene compounds referred to herein are halogenated ethylene compounds containing at least one fluorine atom. Examples of these compounds are vinyl fluoride, 1,1-difluoroethylene, 1-fluoro-1-bromoethylene, 1-fluoro-2-chloroethylene, 1,2-difluoro-1,2-dichloroethylene, 1,1-difluoro-2,2-dichloroethylene, 1,1,2-trifluoro-2-chloroethylene, and tetra-fluoroethylene. The process of this invention is particularly suitable for the stabilization of polyfluoroethylenes, i. e., those containing more than one fluorine atom.

Compounds which can be employed as stabilizers include those having at least one thiol (—SH) group. Examples of such compounds are hydrogen sulfide, mono- and dithiols, such as ethyl mercaptan, propyl mercaptan, butyl mercaptan, ethanedithiol, pentadecanethiol-8 and 2-methylpentane-2,4-dithiol. Aromatic thiols, such as thiophenol, thiocresols, and thionaphthols, can also be employed. The invention is not limited to hydrocarbon thiols, and it is sometimes advantageous to employ a thiol containing another functional group which may aid in the removal of the stabilizer from the fluoroethylene when the occasion demands. Examples of such are thiocarboxylic acids, such as thioglycolic acid, gamma-mercaptovaleric acid, delta-mercaptovaleric acid, and thiosalicylic acid. Other substituted thiols are operable, such as halogenated thiols, thiol alcohols, thiol esters, thiol amides, etc.

The stabilizer is to be employed in amounts ranging from about 0.001% to about 5%, based on the monomer. In general, however, it is preferred to employ the stabilizers in amounts ranging from about 0.01% to about 1%, based on the amount of monomer.

Fluoroethylene compounds which are stabilized according to the method given in this invention can be stored indefinitely without danger of polymerization. On the contrary, the unstabilized compound polymerizes on standing, either completely filling the container with solid polymer or filling the exit valves, so that the removal of the remainder of the unpolymerized material is impossible. Since such circumstances are not only undesirable but also dangerous, it is of great advantage to be able to store tetrafluoroethylene indefinitely without danger of such polymerization and by means of stabilizers which are readily removed from the monomer. Although it is not essential that the stabilizers be removed before catalytic polymerization of the fluoroethylene, if desired, they can be removed, for example, by fractional distillation, by scrubbing with a lead acetate solution or by passing the gas over an absorbent for the stabilizer.

As many apparently widely different embodiments of this invention may be made without departing from the spirit and scope thereof, it is to be understood that I do not limit myself to the specific embodiments thereof except as defined in the appended claims.

I claim:

1. Tetrafluoroethylene stabilized with sufficient hydrocarbon thiol to prevent polymerization of the tetrafluoroethylene at 25° C. and superatmospheric pressure.

2. Tetrafluoroethylene stabilized with sufficient octyl mercaptan to prevent polymerization of the tetrafluoroethylene at 25° C. and superatmospheric pressure.

3. Tetrafluoroethylene stabilized with sufficient n-butyl mercaptan to prevent polymerization of the tetrafluoroethylene at 25° C. and superatmospheric pressure.

4. A process for treating tetrafluoroethylene which substantially reduces its tendency to spontaneous polymerization at normal temperature and superatmospheric pressure, said process comprising mixing with the tetrafluoroethylene a small amount of a hydrocarbon thiol.

5. The process set forth in claim 4 in which said hydrocarbon thiol is octyl mercaptan.

6. The process set forth in claim 4 in which said hydrocarbon thiol is n-butyl mercaptan.

7. The process set forth in claim 4 in which said hydrocarbon thiol is added in amount of from 0.001% to 5% by weight of the tetrafluoroethylene.

8. Tetrafluoroethylene stabilized with hydrocarbon thiol in amount of from 0.001% to 5% by weight of the tetrafluoroethylene.

9. Tetrafluoroethylene stabilized with octyl mercaptan in amount of from 0.001% to 5% by weight of the tetrafluoroethylene.

10. Tetrafluoroethylene stabilized with n-butyl mercaptan in amount of from 0.001% to 5% by weight of the tetrafluoroethylene.

MERLIN MARTIN BRUBAKER.